United States Patent [19]

Föhl

[11] 4,345,665
[45] Aug. 24, 1982

[54] SAFETY BELT SYSTEM FOR MOTOR VEHICLES

[75] Inventor: Artur Föhl, Schorndorf, Fed. Rep. of Germany

[73] Assignee: REPA Feinstanzwerk GmbH, Alfdorf, Fed. Rep. of Germany

[21] Appl. No.: 181,109

[22] Filed: Aug. 25, 1980

[30] Foreign Application Priority Data

Aug. 28, 1979 [DE] Fed. Rep. of Germany ....... 2934749

[51] Int. Cl.³ .............................................. B60R 21/00
[52] U.S. Cl. .................................... 180/270; 280/806
[58] Field of Search ....................... 180/268, 269, 270; 280/806; 24/107.4 A

[56] References Cited

U.S. PATENT DOCUMENTS

| | | | |
|---|---|---|---|
| 3,825,205 | 7/1974 | Takada | 24/107.4 A |
| 4,103,754 | 8/1978 | Ashworth | 180/268 |
| 4,116,295 | 9/1978 | Booth | 180/268 |

*Primary Examiner*—Robert R. Song
*Attorney, Agent, or Firm*—Herbert L. Lerner; Laurence A. Greenberg

[57] ABSTRACT

Safety belt system has an automatic roll-up device and a sensor device which effects locking of the belt in the automatic roll-up device when a predetermined deceleration is exceeded. In combination, the safety belt system has an electric safety current circuit connected to the battery to provide current to energize actuating means which effect locking of the belt in the roll-up device, a switch is provided in the circuit operable by the steering wheel lock. Another switch in the circuit is triggered by the sensor when deceleration is exceeded.

5 Claims, 1 Drawing Figure

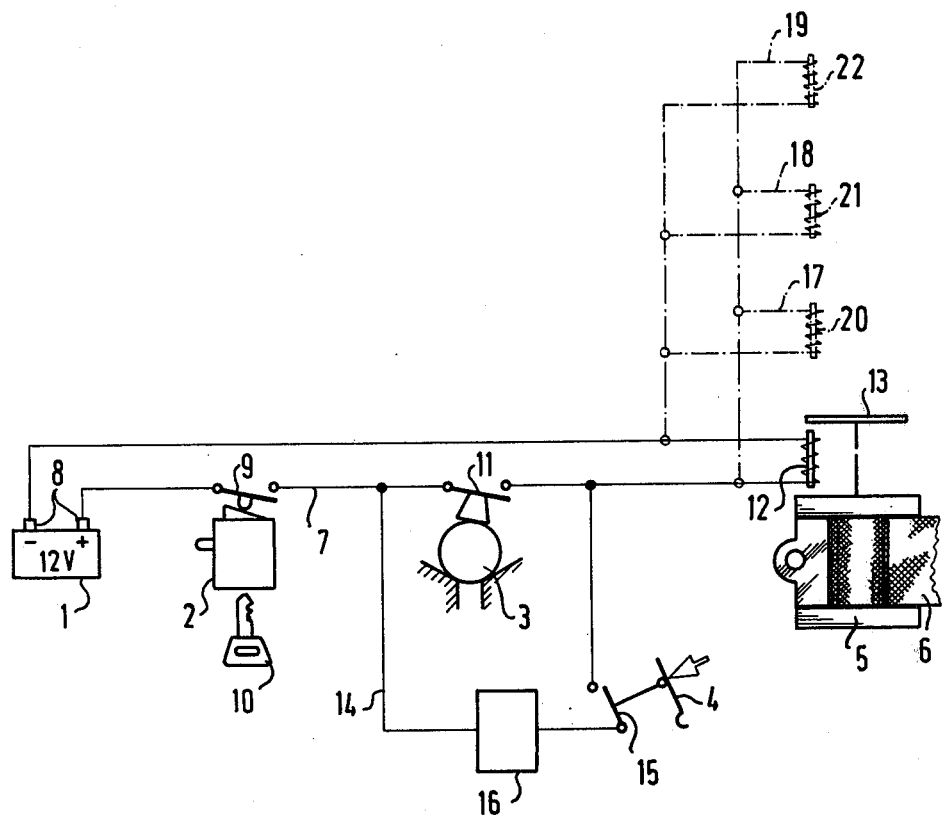

SAFETY BELT SYSTEM FOR MOTOR VEHICLES

BACKGROUND OF THE INVENTION

1. Field of the Invention

The invention relates to a safety belt system for motor vehicles having an automatic roll-up device for the safety belt, and also a sensor device which effects the locking of the safety belt in the automatic roll-up device when a predetermined deceleration of the vehicle is exceeded.

2. Description of the Prior Art

In safety belt systems of this type the safety belt is secured at one side by means of a plug-in tongue in a belt lock which is fastened to the frame of the vehicle. At the other side, the belt is disposed in the rolled-up state in an automatic roll-up device in which the belt can be locked by a locking pawl mechanism which is operated by a sensing device with an inertial mass by means of mechanical trigger elements when a strong deceleration of the vehicle occurs, for example, in the case of a crash. Thereby, the sensing device with the mechanical trigger mechanism inside of the automatic roll-up device form one structural unit.

SUMMARY OF THE INVENTION

An object of the present invention is to provide a safety belt system of the above-described type with a different way of triggering the safety belt system to improve its functional reliability, its sensitivity and effectiveness without depending on the spatial arrangement of the sensing device and the locking mechanism of the automatic roll-up device.

With the foregoing and other objects in view, there is provided in accordance with the invention a safety belt system for motor vehicles having vehicle batteries and steering wheel locks which comprises a safety belt with one end of the belt extending into an automatic roll-up device, locking means in the automatic roll-up device for locking the safety belt, activating means which when energized by an electric current will cause said locking means to lock the safety belt, an electric safety current circuit connected to the vehicle battery for passage of electric current to energize said activating means, a first switch in the circuit operated in conjunction with the steering wheel lock, a second switch in the circuit which normally is in the open position, and a sensor which effects closing of said second switch when a predetermined deceleration of the vehicle is exceeded whereby electric current flows through the circuit from the battery to energize the activating means and cause the locking means to lock the safety belt.

Other features which are considered as characteristic for the invention are set forth in the appended claims.

Although the invention is illustrated and described herein as embodied in a safety belt system for motor vehicles, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing, in which is diagrammatically illustrated the safety belt system wherein a safety-current circuit is connected to a vehicle battery for electric current to energize a solenoid to move a control disc which causes locking pawl mechanism of an automatic roll-up device to lock the seat belt. The circuit has a switch which is operated by the steering wheel lock, and another switch which is closed by a sensor device when the vehicle decelerated too rapidly. This latter switch is bridged by a circuit which has a switch operated by the boot pedal, and also a time delay device to delay opening of the switch.

DETAILED DESCRIPTION OF THE INVENTION

According to the invention, an electric safety current circuit is connected to the vehicle battery through a switch which is operated by the steering wheel lock to activating means which cause the locking of the safety belt. The circuit has another switch which is triggered by the sensing device. An important advantage is due to the fact that the sensing device does not have to operate directly on the locking device with consequent mechanical and friction problems, but only on an electric switch, for example, a micro-switch, which is very simple and functionally reliable. The activating mechanism for locking the locking device, for example, a magnetic coil is also structurally simple and operates problem-free. The functional reliability and sensitivity of the safety system is substantially improved in comparison to purely mechanical safety systems. The fact that voltage is applied to the safety current circuit when the steering wheel lock is unlocked, i.e. the circuit is "made ready", assures protection to persons in the car in most modes of vehicle motion, e.g. even when the car is towed. In addition, the presence of an electric safety circuit provides numerous possibilities for including further automatic safety features into the safety system. For example, through parallel branches of the safety current circuit and suitable electrical trigger devices, the emergency blinker lights of the vehicle can be operated simultaneously with the belt system, or with an automatic back-up device which works in conjunction with the automatic roll-up device, or the like.

According to a further advantageous embodiment of the invention, the contact which is operated by the sensor device can be bridged over by a switch which is connected in a shunting branch circuit. This latter switch is operated by the foot brake of the vehicle. Thereby, a locking of the automatic roll-up device is initiated by electrical means, independent of the sensing device, when the brake is operated.

According to a further development, a time delay device is arranged in the shunting branch circuit which opens the closed shunting circuit branch after a predetermined time interval. Thereby, the locking of the belt is unlocked after a predetermined time, for example, when stopping the car at a traffic light.

The invention is further explained with the aid of a schematic, typical embodiment shown in the drawing.

In the schematic drawing only those parts are shown which are essential for understanding the motor vehicle safety belt system according to the invention. The vehicle battery is designated with 1, the steering wheel lock with 2 which may be operated together with the ignition. A sensor device 3 is in the form of a ball as an inertial mass. Numeral 4 designates the foot brake, or the brake pedal of the motor vehicle, and 5 an automatic roll-up device for the safety belt 6. The automatic roll-up device is a well-known device. A safety-current circuit 7 is connected to the battery clamps 8 of the vehicle-battery 1. In series connection are a switch 9 which is operated by unlocking the steering wheel lock 2 by means of a key 10, a contact 11 operated by the inertial mass of the sensor device 3 when the ball is displaced from its rest position, for example, in the case of a crash. The safety circuit also includes an electric activating means 12 in the form of a magnetic coil (solenoid).

The current supply of the safety current circuit is provided directly from the vehicle battery 1, and the system is without current when the steering wheel lock 2 is locked. When the steering wheel lock 2 is unlocked, voltage is applied to the system over the switch 9, i.e. the system is "alerted" (made ready). In the event deceleration of the vehicle exceeds a predetermined measure, as for example a crash or a very strong application of the brake, the inertial mass of the ball is displaced from its rest position i.e. the sensor device 3 is automatically triggered, whereby the contact 11 is automatically closed. But thereby the activating means 12 is automatically excited, i.e. the magnetic coil is activated. The control disc 13 is attracted by the magnetic induction and this control disc 13 sets in operation the locking mechanism of the automatic roll-up device 5 by means of a not further illustrated locking system in the roll-up device. For example, this can be achieved in the manner that, by the attraction of the control disc 13, a relative motion is effected between the control disc and a rotatable locking pawl arrangement in the automatic roll-up device, by which a locking pawl engages in a locking wheel which is connected to the belt shaft, and thereby locks the belt shaft.

A shunt circuit of bridging current branch 14 has in series-connection, a switch 15 operable by the foot brake 4, and also a time delay device 16. When braking, i.e. when operating the foot brake 4, the contact 11 of the sensor device 3 is electrically bridged-over, and the activating provision 12 connected with the locking of the roll-up device 5, is triggered simultaneously. The locking can be released again by means of the time delay device 16, opening the safety current circuit after a predetermined time interval for example, after a normal stop at a traffic light.

In the drawing, several parallel branches 17, 18, 19 are shown with dotted lines, having corresponding electrical release provisions 20, 21, and 22, which are connected to the safety current circuit. These parallel branches and their respective release provisions, serve for the operation of further automatic devices that are not shown, as for example, emergency blinkers, an automatic emergency-radio call system, and automatic back-up system, or the like. The automatic systems are simultaneously operated with the locking system of the automatic roll-up device 5 in the event of a crash.

There is claimed:

1. Safety belt system for motor vehicles having vehicle batteries and steering wheel locks with a safety-current circuit which does not have a seat switch in the circuit, for activating the safety belt system during the time when motion of the vehicle can occur, which comprises a safety belt with one end of the belt extending into an automatic roll-up device, locking means in the automatic roll-up device for locking the safety belt, activating means which when energized by an electric current will cause said locking means to lock the safety belt, an electric safety current circuit connected to the vehicle battery for passage of electric current to energize said activating means, a first switch in the circuit operated in conjunction with the steering wheel lock, said first switch closed by unlocking the steering wheel lock to provide for current flow in the circuit and permit movement of the vehicle, a second switch in the circuit which normally is in the open position, said first switch and said second switch connected in series in said circuit, and a sensor device which effects closing of said second switch when a predetermined deceleration of the vehicle is exceeded whereby electric current flows through the circuit from the battery to energize the activating means and cause the locking means to lock the safety belt.

2. Safety belt system according to claim 1, wherein a magnetic coil is provided as the activating means.

3. Safety belt system according to claim 1, wherein said second switch is bridged-over by a second circuit having a normally open third switch which is closed by operation of the vehicle brake.

4. Safety belt system according to claim 3, wherein a time delay device is connected in the second circuit, which time delay device opens the third switch after a predetermined time interval.

5. Safety belt system according to claim 1 or claim 2 or claim 3, wherein further automatic devices such as emergency blinker lights or emergency call systems, or the like are connected in parallel circuit branches of the electric safety current circuit.

* * * * *